UNITED STATES PATENT OFFICE.

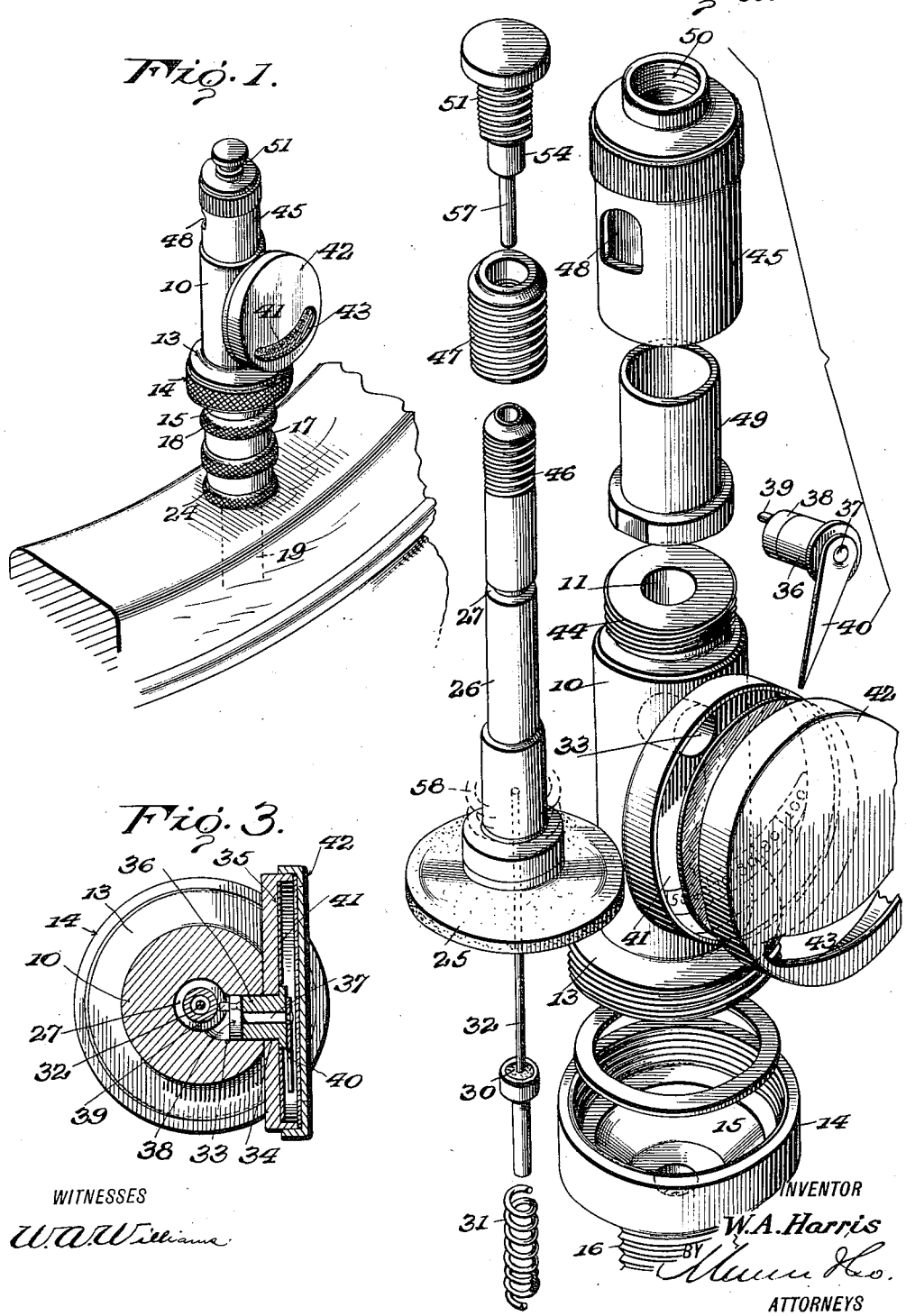

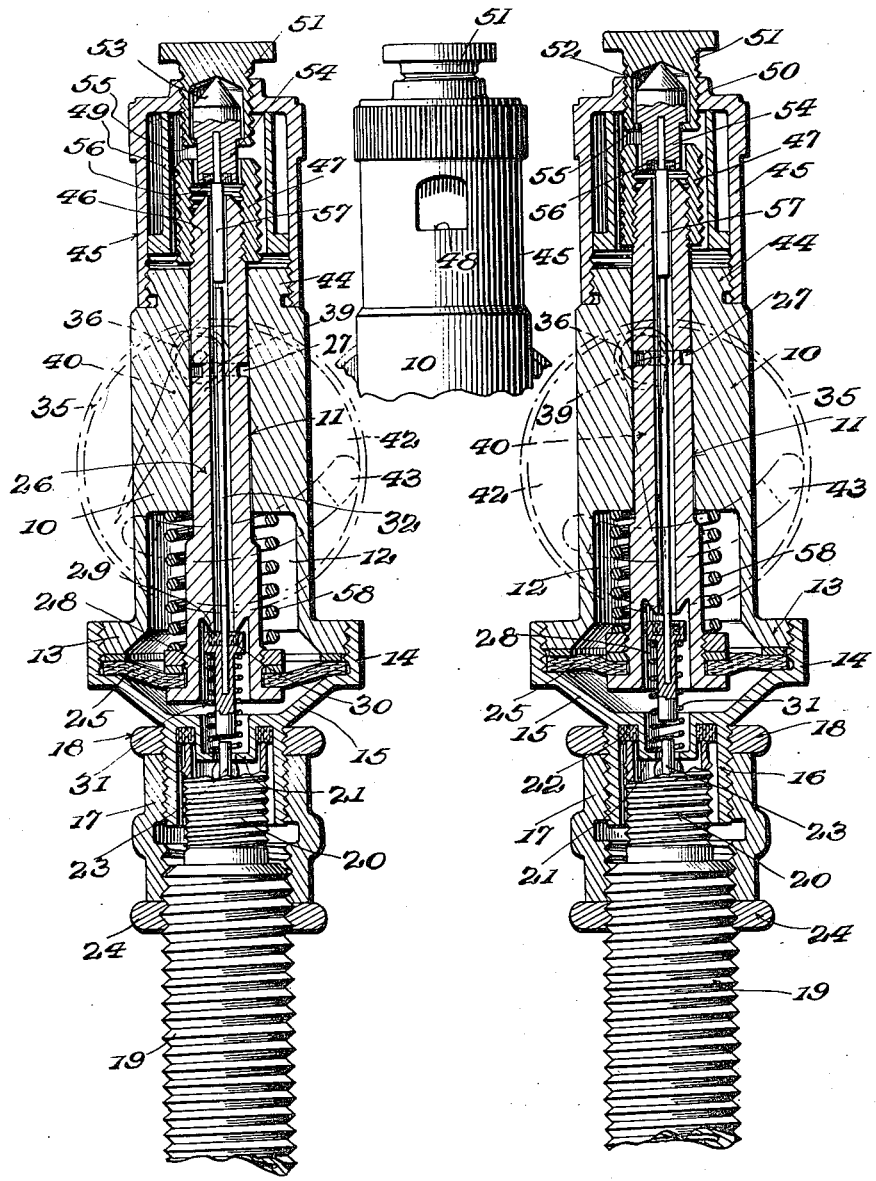

WILLIAM A. HARRIS, OF GREENVILLE, SOUTH CAROLINA, ASSIGNOR TO THE K. S. CONRAD COMPANY, OF GREENVILLE, SOUTH CAROLINA, A CORPORATION OF SOUTH CAROLINA.

TIRE ALARM AND GAUGE.

1,413,531.           Specification of Letters Patent.     Patented Apr. 18, 1922.

Application filed November 3, 1921. Serial No. 512,459.

*To all whom it may concern:*

Be it known that I, WILLIAM A. HARRIS, a citizen of the United States, and a resident of Greenville, in the county of Greenville and State of South Carolina, have invented certain new and useful Improvements in Tire Alarms and Gauges, of which the following is a specification.

My present invention relates generally to a combined gauge and low pressure alarm for pneumatic tires, and more particularly to a device of this character of much similar type to the device described and claimed in my application No. 476,341 which was filed June 9, 1921, the primary object of my present improvements being the provision of a structure capable of more simple economical manufacture as well as one which will be positive and unfailing in its action, proof against dirt, water and other external influences.

Among its more particular objects my invention aims to provide a novel form of connection whereby the device as a whole may be easily and quickly secured upon the valve stem of a pneumatic tire in such a way that the gauge may be faced in the desired direction and accidental displacement and removal in unwarranted hands rendered difficult.

These and further objects together with the resulting advantages of my invention are more plainly to be seen from the following description with reference to the accompanying drawings, forming a part of this specification, and wherein—

Figure 1 is a perspective view illustrating the practical application of the invention, Figure 2 is a perspective view of the various parts thereof in detached relation, Figure 3 is a horizontal section taken on a plane in line with the pointer shaft of the gauge, Figures 4 and 5 are central vertical sections through the device with the parts in different positions, and Figure 6 is a side view of the upper portion of the device.

Referring now to these figures, and as in my previous application above named, the barrel 10, having a central bore 11 and a lower counterbore 12, is threaded at its lower flanged end 13 into the internally threaded annularly flanged upper end 14 of the supporting or base piece 15, the latter of which tapers downwardly and is provided with a lower cylindrical and externally threaded extension 16 provided with a left hand thread. On this extension 16 which is adapted for engagement by one end of a connecting sleeve 17, is a lock nut 18 in the form of a ring adapted to abut one end of the connecting sleeve 17, the latter of which has two internally threaded portions, one with a left hand thread and one with a right hand thread so that it is adapted to engage the extension 16 and also the externally threaded stem 19 of a pneumatic tire valve whose upper reduced end 20 will in the connected position as shown in Figures 4 and 5 project upwardly and into the depending cylindrical extension 16 of the supporting base 15 of the device.

Axially within its tubular externally threaded extension 16, the supporting base 15 is also provided with a depending apertured boss 21 between which and the extension 16 is left an annular recess for the reception of a flexible gasket 22 for engagement in airtight relation in use against the upper end of the tire valve stem 19, into which the boss 21 projects in order to engage the pin 23 of the inner valve of stem 19 and hold said valve off of its seat when the device provided by my invention is disposed on the stem.

In connecting the device on a tire valve stem 19, a lock nut 24 is first screwed onto the stem 19 so that after the sleeve 17 is turned to draw the device tightly down and against the upper end of the stem, the lock nut 24, like lock nut 18, is turned against the connecting sleeve so as to thereafter effectively hold the device in place. It is obvious that by thus connecting the device on the tire valve stem, it is not necessary to rotate the device itself and there is therefore no danger of grinding the gasket or packing ring 22 against the stem end.

In their threadedly connected relation, the lower flanged end 13 of the barrel 10 and the upper flanged end 14 of the supporting base 15, these parts clamp between them the outer edge of a diaphragm 25 to which is connected the lower end of the diaphragm stem 26, the latter being slidable through the bore 11 and counterbore 12 of the barrel 10 and having at a point intermediate its ends and within the barrel an annular groove 27 for a purpose which will be presently described.

The diaphragm stem 26 is hollow from end to end, and its lower end opens through the diaphragm 25 and has a counterbore 28 with a valve seat 29 at the inner end of the counterbore adapted for engagement by an upwardly seating valve member 30 under tension of a spring 31 whose lower end is seated in the boss 21 of the supporting base 15. This valve 30 has a pin 32 which rises in the hollow of the diaphragm stem 26 all as clearly seen in Figures 4 and 5.

By reference to Figures 1, 2 and 3 in particular it will be noted that the barrel 10 has a lateral bore 33 whose inner end communicates with the bore 11 of the stem, and whose outer end registers with an opening 34 in a flanged circular plate 35 which forms the inner part of the housing of the gauge. Bore 33 receives a bearing tube 36 through which a shaft 37 is journaled, said shaft having at its inner end a disk 38 provided with a crank pin 39 the latter of which extends into the annular groove 27 of the diaphragm stem. On the outer end of shaft 37, a pointer 40 swings upon the outer face of the plate 35 on which a dial 41 is placed. The outer part of the gauge housing is constituted by a flanged cap 42 which fits around the flanged plate 35 and has an arcuate slot 43 through which the dial 41 is visible.

The upper end of the barrel 10 is slightly reduced and externally threaded as at 44, to receive the lower internally threaded end of a tubular cap 45, the latter being by this connection readily detachable from the barrel in order to expose the upwardly projecting and externally threaded end of the diaphragm stem 26 when air is to be introduced into the tire valve tube 19 with my improved device in place thereon. For this purpose the upper externally threaded end 46 of the diaphragm stem, which as above stated projects upwardly beyond the upper end of the barrel 10, receives an externally threaded sleeve 47 adapted for attachment to any air introducing apparatus or connections made to fit the upper reduced end 20 of the tire valve stem 19.

The cap 45 has a side wall aperture 48 and an internal whistle tube 49, and is provided with an axial bore and internal threads 50 at its upper end receiving the threaded body of an adjusting screw 51 whose upper end may be manually manipulated for the purpose of turning the same more or less into the cap. This adjusting screw has a bore 52 extending therein from its inner end and the base of this bore is cone shaped to form a central engaging point for the tapering or conical upper end 53 of a valve member 54 which projects below the adjusting screw and whose upper head is movably confined in the bore 52 by a flange 55 formed around the lower end of the adjusting screw. This valve member 54 whose lower gasket or washer 56 is adapted to engage the upper tapering end of the diaphragm stem 26 forming a valve seat therefor, has a depending axial pin 57 which projects into the hollow of stem 26 and the lower end of which is adapted for engagement with the upper end of the pin 32 of the lower valve 30. It is thus obvious that in its downward seating movement on the upper end of the diaphragm stem, the valve 54 is laterally yieldable with respect to the adjusting screw 51 by which it is moved onto its seat, and can in addition rotate with respect to this screw so as to insure a tight non-leaking joint when the valve is seated without grinding its gasket or washer 56 against the seat.

In use, with my improved low pressure alarm and gauge secured on the valve tube or stem 19 of a tire in the position shown in Figures 1, 4 and 5, and by the means previously described, including the oppositely threaded connecting sleeve which admits of rigid positioning of the device on the tire valve tube or stem without rotation of the device itself so that the gauge housing may be turned outermost in the proper direction, it is obvious that the inner valve 30 will act as an air retainer valve, yieldable away from its seat 29 to admit of the introduction of air into the tire through the hollow stem 26. It is to be understood of course that the cap 45 is detached from the barrel 10 at this time, permitting a pump or other air inflating device to be associated with the upper end of the diaphragm stem 26. During inflation, the diaphragm stem 26 gradually moves in an outward direction in the barrel 10 by virtue of exposure of the inner face of the diaphragm 25 to the pressure of the tire, against the tension of the actuating spring 58 within the counterbore 12 of the barrel 10. It is equally apparent that during this outward movement of the diaphragm stem 26, the gauge will be actuated by movement of the pointer 40 of the barrel 41 through engagement of the inner crank pin 39 of the pointer shaft 37 within the annular groove 27 of the diaphragm stem.

When the gauge, which is on account of its position within full view of the operator at all times, shows that the desired pressure has been reached, the inflating device is removed from the upper end of the diapharagm stem and the cap 45 is screwed onto the upper end of the barrel 10 in the position shown in Figure 4 after which the adjusting screw 51 is manually turned into the cap until the valve 54 is seated against the upper end of the diaphragm stem 26. During this movement of the adjusting screw 51 it is obvious that the inner end of its depending pin 57 will first engage the upper end of the pin 32 of the lower valve 30 so that this lower valve 30 will be forced downwardly and unseated before the outer valve 54, the latter of which is the alarm controlling valve, seats. After seating of the outer or alarm controlling valve 54 the operator continues to turn the adjusting screw 51 inwardly until, through the inward movement of the diaphragm stem 26, the pointer 40 reaches a position upon the dial 41 at which the operator desires an alarm to sound during gradual decrease of pressure within the tire.

Thus after fully inflating the tire and during which the gauge acts to show the exact pressure in the tire, and after the cap has been placed and the parts properly adjusted by manual manipulation of the adjusting screw 51, it is obvious that the gauge will then indicate the pressure at which the alarm is to be sounded, at least until this alarm is in fact sounded.

When the pressure in the tire falls to the point set for the sounding of the alarm, the diaphragm stem will have receded inwardly to a point where its upper end is withdrawn from the outer valve member 54, this action of the parts being by virtue of the pressure of the spring 58 which bears downwardly upon the diaphragm and overcomes the gradually reducing tire pressure. When the upper end of the diaphragm stem 26 initially leaves the valve member 54 the depending pin 57 of valve 54 will still hold the lower or inner air retaining valve 30 off of its seat as shown in Figure 5 and it is apparent that air from the interior of the tire will rush upwardly and outwardly through the stem and will in its passage through the whistle tube 49 and from the cap opening 48, sound an alarm, this alarm continuing to be sounded until during further fall of pressure within the tire the diaphragm stem 26 recedes inwardly to a point where the air retaining valve 30 can engage the inner valve seat 29 of the stem so as to cut off outward movement of the air. If for any reason it is desired at this point to reset the alarm without inflating the tire, the adjusting screw 51 may again be turned inwardly in the manner previously described and the parts set for operation at a further reduction of the pressure within the tire. Assuming however that it is desired to reinflate the tire the cap 45 is unscrewed and removed for this purpose and when reinflation has been completed the cap is then replaced and the parts are in position without further adjustment by virtue of the fact that in removing the cap the adjusting parts, that is adjusting screw 51 and the valve 54 are removed bodily with the cap.

The device as thus constructed is extremely simple and economical in its formation as is possible considering the functions it will serve in practice, and in addition to this the construction promotes effective uniform operation and is proof against adverse action of the elements including water and dirt.

I claim:

1. In a low pressure alarm for pneumatic tires, a barrel having an axial bore, a base piece attachable to the valve stem of a tire and connected to the inner end of the barrel, a diaphragm clamped between the barrel and the base piece, a hollow stem slidable in the bore of the barrel and secured at its inner end to the diaphragm and opening through the latter, a spring pressed valve in the base piece for closing the inner end of the hollow stem, provided with a pin extending outwardly in the hollow of the stem, a cap threaded on and detachable from the outer end of the barrel, having an alarm whistle, an adjusting screw threaded axially through the outer end of the cap, and a valve member removable with the cap, said valve member being carried by and shiftable with the adjusting screw for closing the outer end of the diaphragm stem and having a pin extending within the hollow of the stem for engagement with the pin of the first mentioned valve as and for the purpose set forth.

2. In a low pressure alarm for pneumatic tires, a barrel having an axial bore, a base piece attachable to the valve stem of a tire and connected to the inner end of the barrel, a diaphragm clamped between the barrel and the base piece, a hollow stem slidable in the bore of the barrel and secured at its inner end to the diaphragm and opening through the latter, a spring pressed valve in the base piece for closing the inner end of the hollow stem, provided with a pin extending outwardly in the hollow of the stem, a cap threaded on and detachable from the outer end of the barrel, having an alarm whistle, an adjusting screw threaded axially through the outer end of the cap, and a valve member removable with the cap, said valve member having a rotatable and laterally shiftable connection with the adjusting screw so as to engage the outer end of the diaphragm stem without rotation and close the latter, said last mentioned valve having a pin extending into the hollow of the diaphragm stem for engagement with the pin of the first mentioned valve as and for the purpose set forth.

3. In a device of the character described, a pressure actuated and controlled diaphragm, a hollow stem secured at its inner end to the diaphragm and opening inwardly therethrough, said stem having valve seats at its inner and outer ends, a spring for shifting the stem in one direction, a pressure retaining valve engageable with the inner seat of the stem, alarm means, and an alarm controlling valve engageable with the outer seat of the stem and having means extending through the stem to unseat the said retaining valve.

4. In a device of the character described, a pressure actuated and controlled diaphragm, a hollow stem secured at its inner end to the diaphragm and opening inwardly therethrough, said stem having valve seats at its inner and outer ends, a spring for shifting the stem in one direction, a pressure retaining valve engageable with the inner seat of the stem, a barrel in which the stem is movable, a cap for said valve having alarm means, and an adjustable valve carried by the cap, for movement against the outer seat of the stem and having means to unseat the pressure retaining valve as described.

5. A device of the character described including a pressure controlled and spring actuated stem, a spring controlled pressure retaining valve normally closing the inner end of the stem, alarm means receiving pressure from the outer end of the stem, and an alarm controlling valve normally closing the outer end of the stem and having means extending through the stem to unseat the inner valve.

6. A device of the character described including a barrel, a pressure controlled spring actuated stem movable in the barrel and having an air passage therethrough, a spring actuated air retaining valve for closing the inner end of the stem, a cap detachably mounted on the barrel around the upper end of the stem and having alarm means, and an adjustable valve carried by and removable with the cap, for closing the outer end of the stem, said adjustable valve having means to unseat the first named valve while the adjustable valve is in closed position.

7. The combination with a tire valve stem, of a low pressure alarm device having means to sound an alarm upon fall of tire pressure below a predetermined point and having threads at one end opposite to those of the said stem, and adjustably locked means including a connecting sleeve having internal oppositely threaded portions for engaging the threads of the alarm device and the stem to secure the former to the latter without necessitating rotation of the alarm device.

8. The combination with a tire valve stem, of a low pressure alarm device having means to sound an alarm upon fall of tire pressure below a predetermined point and having a lower extension threaded oppositely with respect to said stem, a connecting sleeve having internal oppositely disposed threads for joining the said threaded extension to said stem without necessitating rotation of the alarm device, and locking members working on the threads of the extension and the stem and for engagement with opposite ends of the sleeve to securely hold the latter in place.

WILLIAM A. HARRIS.